United States Patent
Clifford et al.

(10) Patent No.: US 7,638,000 B2
(45) Date of Patent: *Dec. 29, 2009

(54) ROBOTIC APPARATUS WITH NON-CONDUCTIVE WRIST FOR PAINTING

(75) Inventors: Scott J. Clifford, Rochester Hills, MI (US); Paul D. Copioli, Sterling Heights, MI (US); Michael G. Beem, Sterling Heights, MI (US); Robert C. Foti, Fenton, MI (US); Stan H. McClosky, Rochester Hills, MI (US); Matt Zimmerer, Royal Oak, MI (US); Brad O. Niederquell, Troy, MI (US); W. Daniel Mantz, Clarkston, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/872,372

(22) Filed: Oct. 15, 2007

(65) Prior Publication Data

US 2008/0083371 A1 Apr. 10, 2008

Related U.S. Application Data

(63) Continuation of application No. 10/691,939, filed on Oct. 23, 2003, now Pat. No. 7,399,363.

(60) Provisional application No. 60/420,612, filed on Oct. 23, 2002, provisional application No. 60/420,971, filed on Oct. 24, 2002, provisional application No. 60/423,636, filed on Nov. 4, 2002.

(51) Int. Cl.
*B05B 3/00* (2006.01)
*B05B 5/00* (2006.01)

(52) U.S. Cl. .................. 118/323; 118/620; 118/629; 118/326; 901/45; 901/29

(58) Field of Classification Search ................ 118/323, 118/321, 300, 620, 621, 629, 326; 901/43, 901/15, 27, 29, 41, 49, 50; 138/121, 109, 138/120; 239/690, 690.1, 750–752; 427/427.2, 427/427.3

See application file for complete search history.

(56) References Cited

U.S. PATENT DOCUMENTS 2,930,350 A 3/1960 Gengenbach et al.

(Continued)

FOREIGN PATENT DOCUMENTS

| EP | 0 693 319 | 1/1996 |
|----|-----------|--------|
| JP | 10015873 A | 1/1998 |
| JP | 11114873 A | 4/1999 |
| JP | 11267560 A | * 10/1999 |

OTHER PUBLICATIONS

English Translated Abstract JP-11267560A, Oct. 1999.*

*Primary Examiner*—Yewebdar T Tadesse
(74) *Attorney, Agent, or Firm*—Fraser Clemens Martin & Miller LLC; William J. Clemens

(57) ABSTRACT

A painting robot outer arm includes a non-conductive housing mounting a color changer on the outside and a paint canister on the inside connected by an isolating paint transfer line. The paint canister is releasably attached to a piston ram and drive motor by a quick disconnect coupling. The paint supply is isolated from the applied high voltage by cleaning and drying the transfer line. The rate of filling of the canister can be controlled in response to sensed torque applied by a drive motor moving a piston in the paint canister.

17 Claims, 11 Drawing Sheets

U.S. PATENT DOCUMENTS

| | | | |
|---|---|---|---|
| 3,724,755 A | 4/1973 | Diamond et al. | |
| 4,402,234 A | 9/1983 | Malarz et al. | |
| 4,712,739 A * | 12/1987 | Bihn | 239/290 |
| 4,884,752 A | 12/1989 | Plummer | |
| 4,932,589 A | 6/1990 | Diana | |
| 5,014,644 A * | 5/1991 | Yamamoto et al. | 118/314 |
| 5,063,828 A | 11/1991 | Kamimura | |
| 5,100,057 A | 3/1992 | Wacker et al. | |
| 5,127,831 A | 7/1992 | Bab | |
| 5,273,059 A * | 12/1993 | Gross et al. | 134/57 R |
| 5,293,911 A | 3/1994 | Akeel | |
| 5,320,283 A | 6/1994 | Hollstein et al. | |
| 5,367,944 A | 11/1994 | Akeel et al. | |
| 5,413,283 A | 5/1995 | Gimple et al. | |
| 5,772,125 A | 6/1998 | Ehinger et al. | |
| 5,851,292 A | 12/1998 | Minoura et al. | |
| 6,164,561 A | 12/2000 | Yoshida et al. | |
| 6,250,502 B1 | 6/2001 | Cote et al. | |
| 6,261,042 B1 | 7/2001 | Pratt | |
| 6,308,868 B1 | 10/2001 | Hoffman et al. | |
| 6,346,150 B1 | 2/2002 | Conlin | |
| 7,328,862 B2 | 2/2008 | Takebe et al. | |
| 2001/0013315 A1 | 8/2001 | Klein et al. | |
| 2001/0023767 A1 * | 9/2001 | Berninger et al. | 174/48 |

* cited by examiner

ROBOTIC APPARATUS WITH NON-CONDUCTIVE WRIST FOR PAINTING

CROSS-REFERENCE TO RELATED APPLICATION

This application claims the benefit of U.S. provisional patent application Ser. No. 60/420,612 filed Oct. 23, 2002, the U.S. provisional patent application Ser. No. 60/420,971 filed Oct. 24, 2002, and the U.S. provisional patent application Ser. No. 60/423,636 filed Nov. 4, 2002.

This application is a continuation of the U.S. patent application Ser. No. 10/691,939 filed Oct. 23, 2003, now U.S. Pat. No. 7,399,363 issued Jul. 15, 2008.

BACKGROUND OF THE INVENTION

The present invention relates generally to robotic painting systems and in particular to a robotic apparatus for applying electrically conductive paint to the external surfaces of automotive vehicle bodies.

Prior art paint booths are well known. A typical prior art paint booth, used to paint the exterior surfaces of vehicle bodies in both continuous conveyance and stop station systems, includes an enclosure housing a plurality of paint applicators. In one configuration, the applicators are mounted on an inverted U-shaped support structure that includes two vertical supports, one on either side of the path of travel of the bodies, connected at their tops by a horizontal support. This support structure is used to paint the top surfaces of the body and the horizontal beam can be fixed or can have an additional degree of freedom to move along the top of the vehicle body being painted. Another painting device is used in the same painting zone to paint the sides of the body and generally does not have the capability to move laterally along the length of the body. Disadvantages of this type of painting apparatus include lack of flexibility to provide optimized standoff distance between the body surface and the applicator along with inefficient use of the allotted painting cycle time. In the case of the top surface painting machine, the paint applicators are mounted on a common beam: therefore, the distance between each paint applicator and the surface to be painted varies with the contours of the vehicle body. In the case of the side painting machine, the paint applicators do not move transverse to the path of the vehicle body. They can only paint the portion of the body that is in front of the applicator leaving a good portion of the available cycle time unused.

A more recent alternative to the support structure has been floor-mounted robots disposed along the sides of the painting booth. The robots mount either spray guns or rotary applicators (bell machines) for directing atomized paint toward the vehicle body.

While rotary applicators have advantages over spray guns, there are some associated disadvantages. The prior art floor mounted robots, especially bell machines, are inherently very costly and limit visual access to the spray booth. The bell machines require more bells for the same throughput due to limited orientation capability. The additional bells use more paint per vehicle due to per bell paint waste during color changing. Prior art floor mounted robots also require significant booth modification when installed in existing paint booths, increasing installation time and cost, and require more booth length and width. The rail axis of floor mounted robots requires doors at both ends of the booth. The waist axis of the floor mounted robot requires an additional safety zone at the ends of the spray booth and the rail cabinets of the floor mounted robots encroach into the aisle space. Floor mounted robots also require frequent cleaning due to the down draft of paint overspray causing paint accumulation on the robot arm and base, which results in higher maintenance and cleaning costs.

The prior art bell zone machines also lack flexibility. Additional and more flexible robot zones are required because the prior art machines unable to reach substantially all paintable surfaces on one side of the body and, therefore, have limited backup capability for an inoperative painting machine. Additional robot zones are also used to provide backup capability for the less flexible prior art painting machine.

It is desirable, therefore, to provide a painting apparatus and a painting system that utilizes robots in an efficient and cost-effective manner that minimizes paint waste, occupies little space (length and width) in the paint booth and can be installed in existing paint booths without requiring significant booth modification. It is also desirable to provide a painting apparatus wherein one painting robot is able to reach substantially all paintable surfaces on one side of the article to provide backup capability in the case of an inoperative robot.

Due to the conductivity of the waterborne paint, it is necessary to electrically isolate the grounded bulk paint supply system from a charged local dispensing canister and spray application system. In the prior art, the bell applicator, canister, canister drive, electrostatic cascade, and docking interface were all integrated into a single unit mounted on the robot wrist as shown in the U.S. Pat. No. 5,293,911 and the U.S. Pat. No. 5,367,944. Such an applicator had the following shortcomings:

1) The applicator is heavy, expensive, and subject to damage via collision with objects in the painting booth.

2) The applicator docking with a docking station must occur in a fixed booth position and therefore limits process flexibility.

3) The docking process takes cycle time as the robot must travel to and from the docked position. The canister filling can not start until the applicator reaches the docked position.

4) The docking hardware is expensive and unique to waterborne systems.

Another method to isolate the bulk paint supply system from the charged paint dispensing canister is to clean and dry the paint transfer line between the supply system and the canister. The cleaning and drying of the transfer line between the bulk supply system and the paint dispensing canister has not been successfully implemented in an automotive type painting system (rapid color changing on a continuous conveyance type system). There are several reasons why this type of system has not been used in the past. These shortcomings include:

1) The time to clean and dry the line and provide high voltage isolation exceeds the allotted dwell time between the vehicle bodies being painted.

2) The high voltage cannot be easily contained and thus the isolation system is compromised (arcing and pin holing). The electrostatic erosion can burn holes in the transfer line, the dispensing system, the supply line to the applicator, or the waste collection lines. The resultant down time would not be readily accepted for this type of application.

3) The amount of waste that is left in the paint transfer line is excessive when compared to other means of isolation.

4) The acceptable voltage limit does not provide high painting transfer efficiency as compared to other means of voltage isolation.

SUMMARY OF THE INVENTION

The present invention concerns an apparatus, method, and system for painting objects in a paint booth or similar enclosure.

The improvements rendered to overcome these shortcomings provide a cost effective solution to effectively utilize the environmental benefits of today's waterborne coatings.

The present invention concerns a painting apparatus including: an arm adapted for use with a painting robot, the arm having a housing formed of a non-conductive material; a color changer mounted on an exterior surface of one side of the housing, the color changer adapted to be connected to a paint supply; a paint canister mounted inside the housing; and a paint transfer line connecting the color changer to an interior of the paint canister for transferring paint from the color changer to the interior of the paint canister. The paint transfer line is formed of an electrically insulating material such as FEP material. The apparatus has a wrist attached to the arm, the wrist having a wrist housing formed of an electrically insulating material and the wrist being adapted to mount a paint applicator. A piston ram is mounted in the housing and is connected to the paint canister for controlling a flow of the paint into and out of the paint canister. The piston ram includes a piston releasably attached to a ram body by a ram locking key. The apparatus includes a canister quick disconnect for releasably attaching the paint canister to the piston ram wherein the canister quick disconnect includes convex locking means on the piston ram releasably engaged with concave locking means on the paint canister. The piston ram includes a ball screw and cooperating ball screw nut and including a drive motor connected to the ball screw for actuating the piston ram.

The painting apparatus according to the present invention also comprises: an arm adapted for use with a painting robot; a paint canister mounted inside the arm; a piston ram mounted inside the arm and having a piston movable inside the paint canister; and a canister quick disconnect releasably attaching the paint canister to the piston ram. A drive motor is connected to the piston ram for moving a piston in the paint canister wherein a torque generated by the drive motor represents a pressure being applied to the piston by paint in the paint canister.

The present invention further concerns a method of operating a robotic painting apparatus comprising the steps of: a) providing a color changer adapted to be connected to a paint supply; b) providing a paint canister connected to a paint applicator; c) connecting an electrically insulating paint transfer line between the color changer and an interior of the paint canister; d) transferring a quantity of paint from the color changer to the interior of the paint canister; e) cleaning and drying an interior of the paint transfer line; f) applying high voltage to charge the quantity of paint; and g) dispensing the paint from the paint canister to the paint applicator. The method includes performing the step d) by transferring paint remaining in the paint transfer line to the paint canister prior to performing the step e). The method also includes starting the step f) before completing the step e). The method further includes sensing a pressure generated as the quantity of paint is being transferred during the step d) and utilizing the pressure sensing to optimize the paint transfer process as well as protecting the system from over pressurization in case of an equipment malfunction. The amount and flow rate of the paint transferred to the paint canister or to the paint applicator is controlled by the drive motor position or the drive motor velocity.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 8 is an enlarged fragmentary perspective view of the outer arm shown in FIG. 5 from the canister side in;

DESCRIPTION OF THE PREFERRED EMBODIMENT

Figure 1:
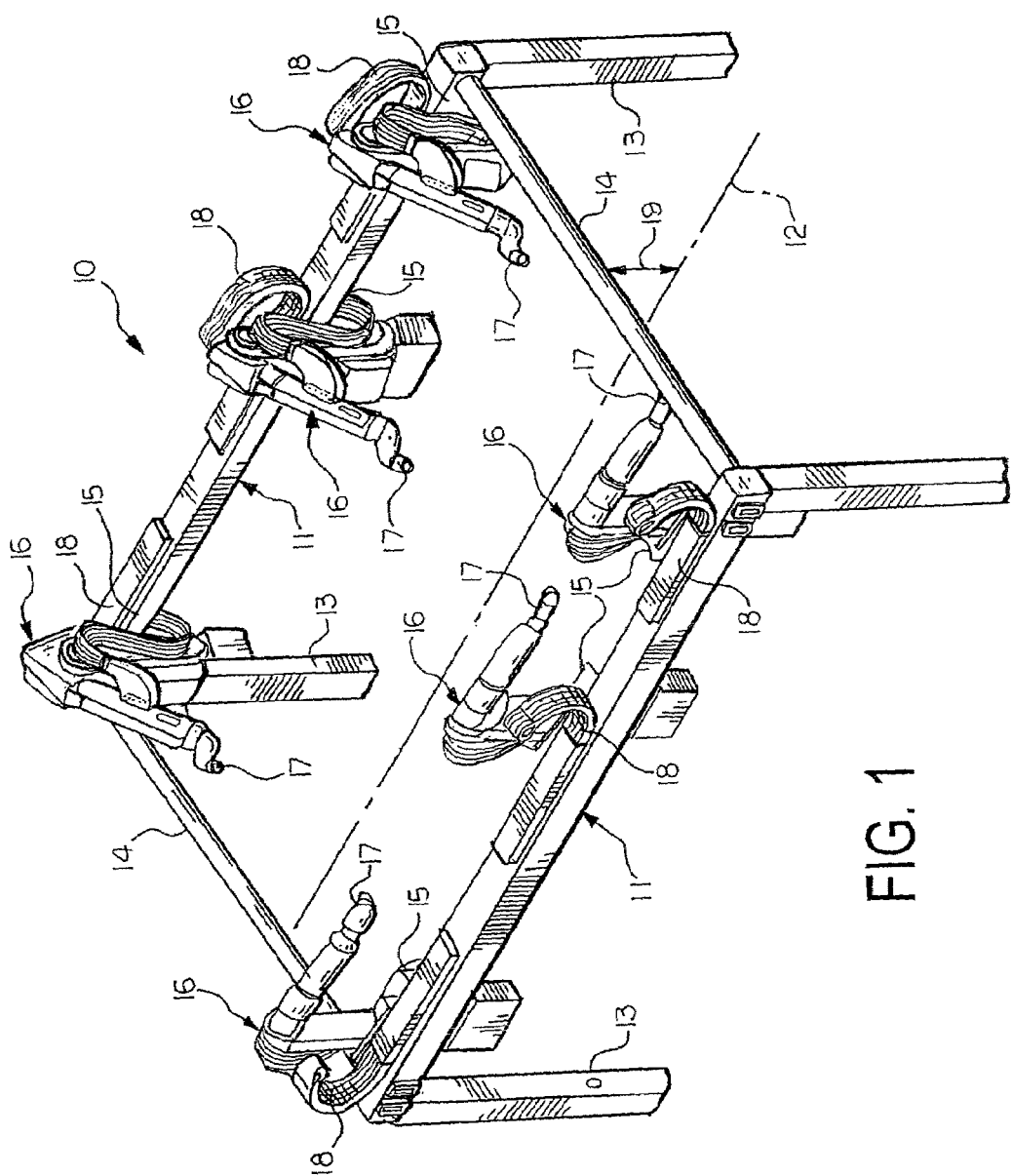
FIG. 1 is a perspective view of a modular elevated rail apparatus in accordance with the present invention.

There is shown in FIG. 1 a modular elevated rail apparatus 10 for painting articles or objects in accordance with the present invention. The elevated rail apparatus 10 is adapted to be disposed in a paint booth as discussed below. The apparatus 10 includes a pair of frame rails 11 extending in a horizontal direction and spaced apart a predetermined distance on opposite sides of an axis 12 defining a path of travel for objects to be painted. Each end of each of the frame rails 11 is supported on an upper end of an associated one of a plurality of legs 13 adapted to engage a floor of the painting booth. Corresponding ends of the frame rails 11 can be connected by cross support members 14 that cooperate with the frame rails 11 and the legs 13 to form a modular, rigid supporting frame structure of the apparatus 10. If required for support, additional ones of the legs 13 and the members 14 can be attached intermediate the ends of the frame rails 11.

The frame rails 11 each have at least one mounting base 15 attached thereto. Three such bases 15 are shown on each of the rails 11. Each of the mounting bases 15 is adapted to retain a painting device 16. The preferred painting device 16 is a robotic four axis articulated arm terminated at a free end by a paint applicator 17. The arm includes a shoulder axis, an elbow axis, a wrist rotating axis and a wrist tilting axis.

Although a rotary bell atomizer is shown as the paint applicator 17, any known device such as a spray gun could be used. The painting device 16 and the mounting base 15 move together parallel to the longitudinal axis 12 to provide a fifth axis of movement. The painting device 16 is provided with electrical power and fluids, such as paint, compressed air and solvent, through a flexible ribbon 18 connected between the painting device and the frame rail 11. Preferably, the painting devices 16 are mounted in opposed pairs for simultaneously painting opposite surfaces of an object such an automobile body or the like (not shown) moved through the apparatus 10 along the axis 12. If the shown location of the axis 12 represents the top surfaces of the objects being painted, the frame rails 11, the support members 14 and the mounting bases 15 may be advantageously spaced a predetermined vertical distance 19 above the horizontal plane containing the axis 12.

The elevated rail apparatus 10 can easily be installed as a new painting booth is constructed, or as a retrofit to an existing paint booth without requiring significant modification to the existing paint booth. The frame rails 11, the legs 13 and the support members 14 can be brought into a painting booth and assembled into the rigid frame structure. Although the elevated rail apparatus 10 is described in terms of a painting process, the paint applicator 17 can be any tool suitable for performing a process on an object moved along a path.

Figure 2:
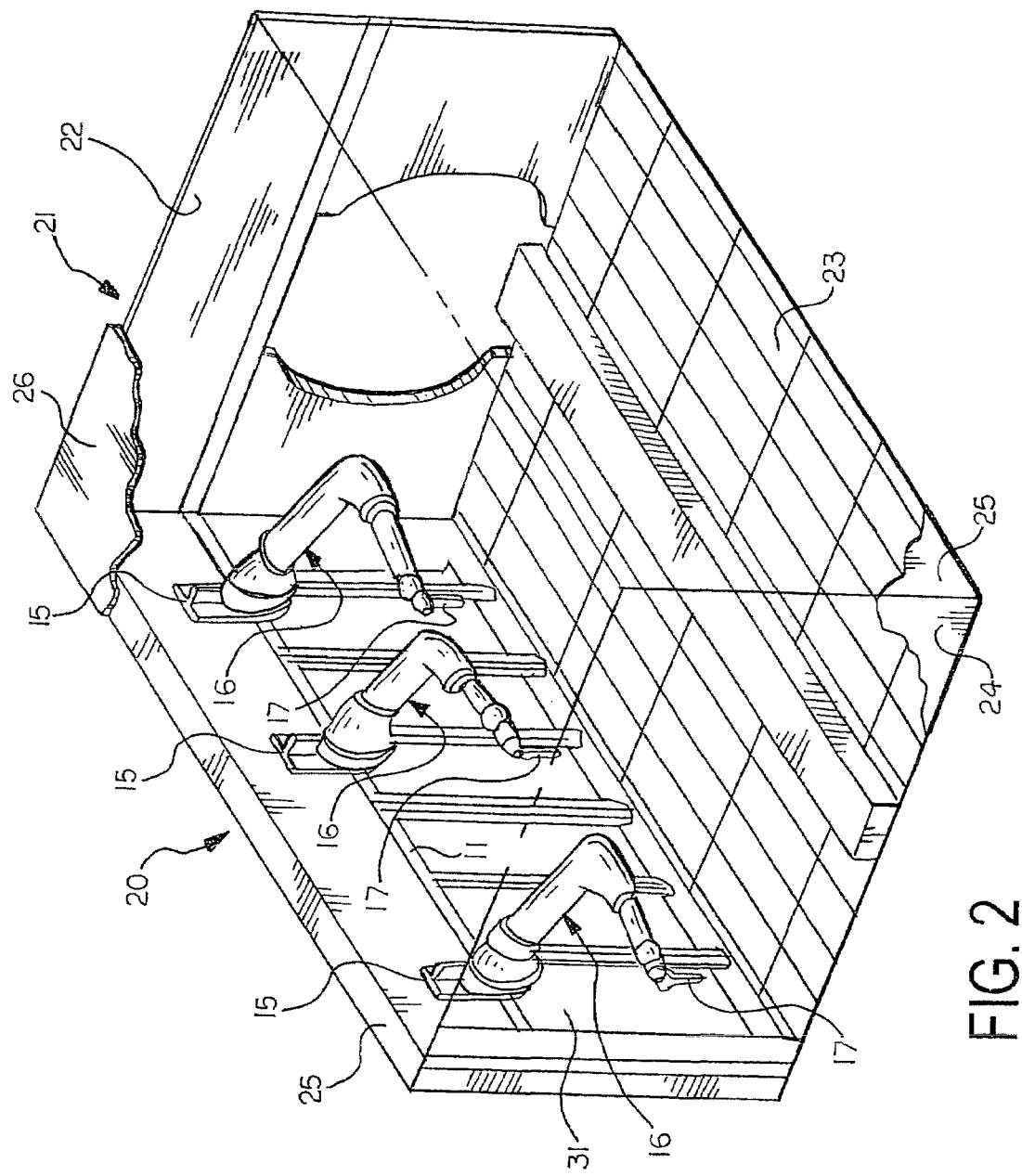
FIG. 2 is fragmentary perspective view of an alternate embodiment of the elevated rail apparatus according to the present invention shown installed in a painting booth.

An alternate embodiment elevated rail apparatus 20 according to the present invention is shown in FIG. 2 installed in a painting booth 21. The painting booth 21 includes a rear or exit wall 22, a lower wall or floor 23, a front or entrance wall 24, a pair of side walls 25 and a top wall or roof 26. The right side wall 25, the front wall 24 and the top wall 26 are cut away to permit the interior of the booth 21 to be seen. The walls 22 through 26 are connected together to define an enclosed space in which the elevated rail apparatus 10 of FIG. 1 may be advantageously disposed. However, the alternate embodiment elevated rail apparatus 20 is adapted to be disposed in an upper portion of the paint booth 21 on the side walls 25. The apparatus 20 includes the frame rail 11 extending along an interior surface of the left side wall 25. The frame rail 11 can be attached to the side wall 25 by any suitable means. A second one of the frame rails 11 (not shown) is positioned on the opposite interior surface of the right side wall 25 such that the booth connects the frame rails 11 in a rigid frame structure. Movably attached to the frame rails 11 are the mounting bases 15 with the painting devices 16 and the painting applicators 17.

Figure 3:
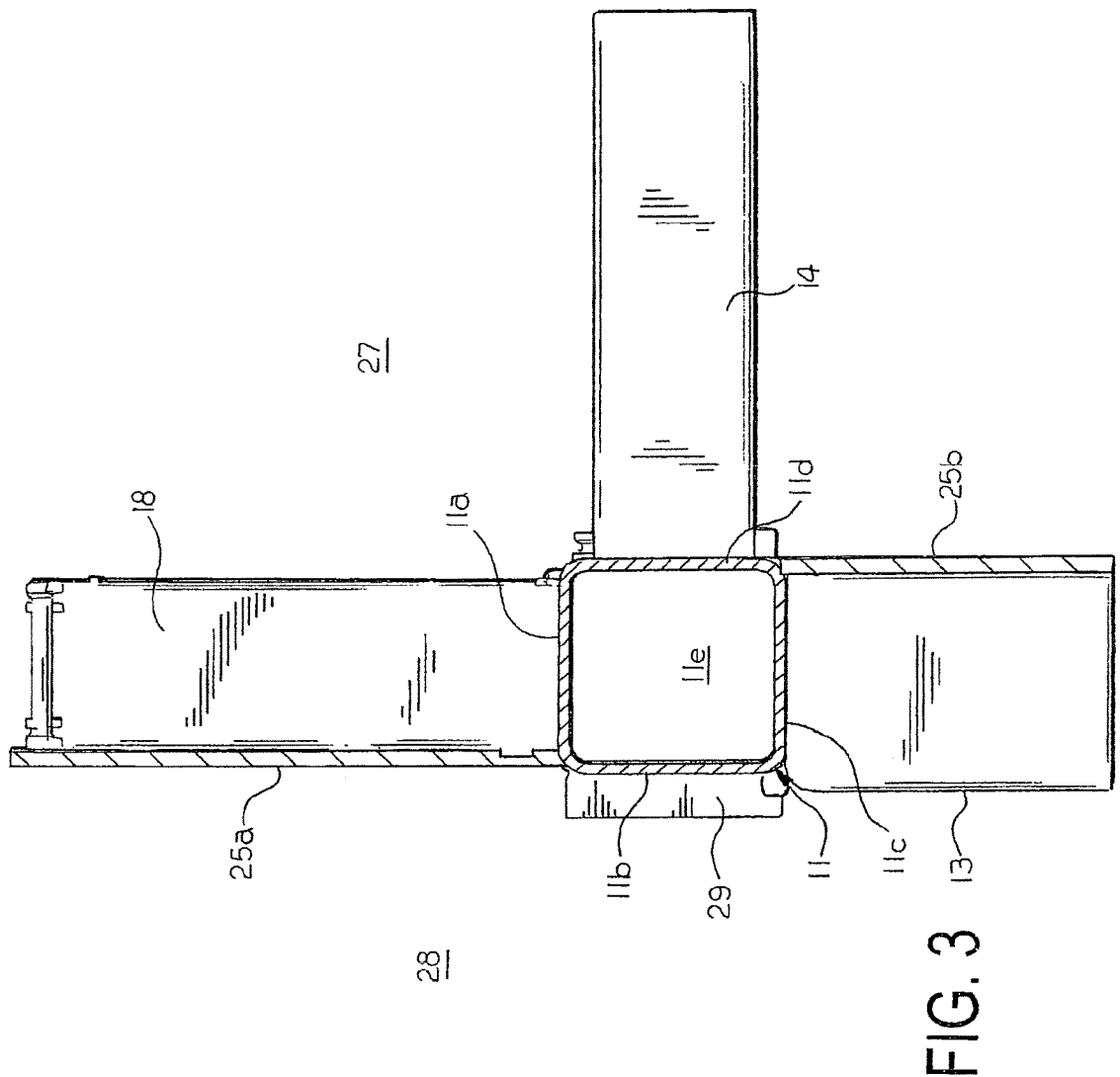
FIG. 3 is a fragmentary cross sectional view of a portion of the elevated rail apparatus of FIG. 1 installed in a painting booth in a first configuration.

There is shown in FIG. 3 a portion of the apparatus 10 at a side wall of the painting booth. The side wall is split with an upper portion 25a above the frame rail 11 and a lower portion 25b below. The upper portion 25a abuts an upper surface 11a of the frame rail 11 near an outer side surface 11b. The lower portion 25b abuts a lower surface 11c of the frame rail 11 near an inner side surface 11b to which the cross support member 14 is attached. Thus, the frame rail 11 forms a part of the side wall separating an interior space 27 of the painting booth from an aisle 28 outside the booth. The frame rails 11 are made of tubular stock and are preferably rectangular in cross section having a hollow interior 11e. Alternatively, the frame rails 11 are formed from any shape of tubular stock including, but not limited to, circular stock. A coupling conduit 29 is attached to the surface 11b for routing electrical and fluid lines from the aisle 28 into the interior 11e of the frame rail 11. The cross support members 14 also are tubular for routing electrical and fluid lines. The frame rails 11 and the cross supports 14 can be sealed, purged and pressurized to function in the painting booth environment.

Figure 4:
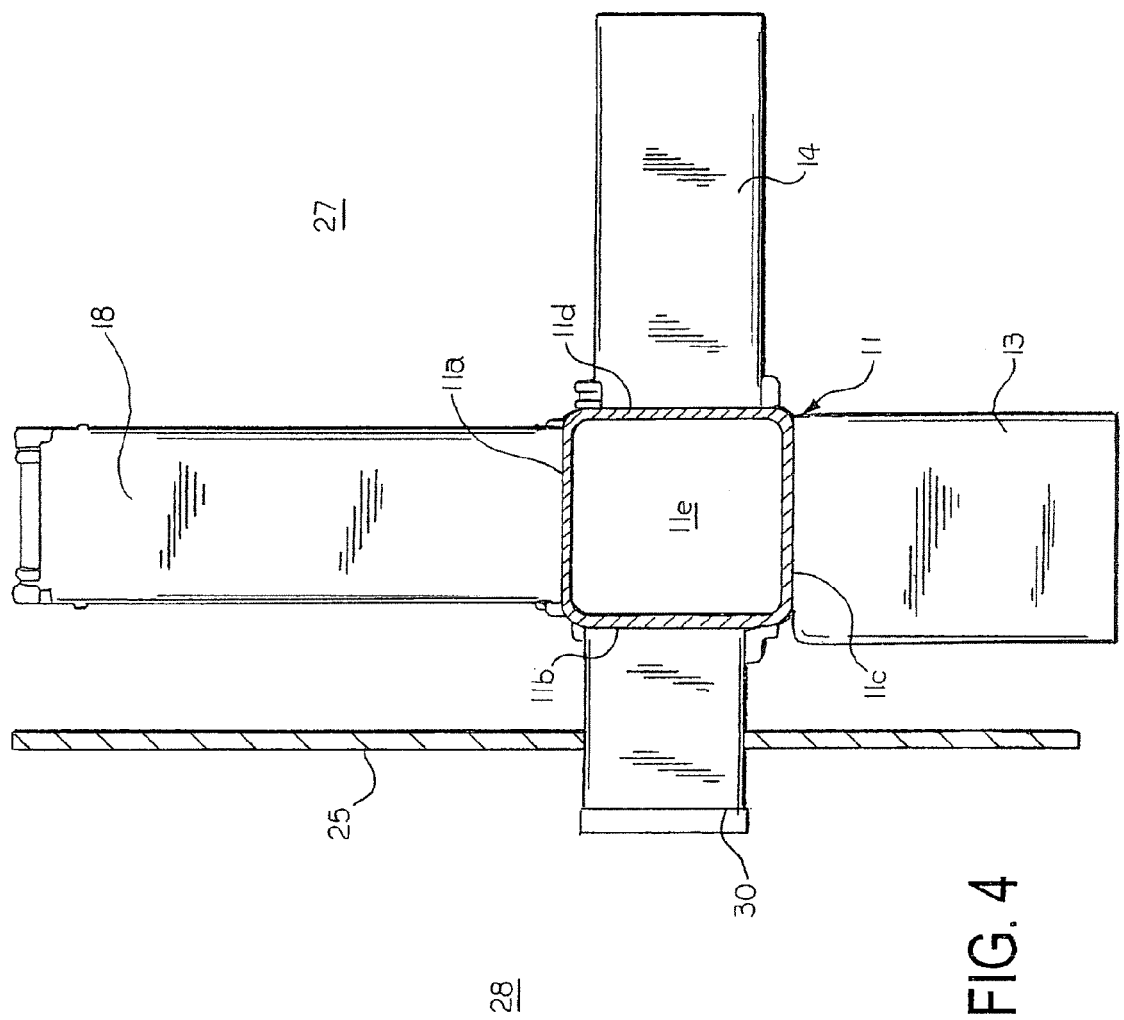
FIG. 4 is a fragmentary cross sectional view similar to FIG. 3 showing the elevated rail apparatus installed in a painting booth in a second configuration.

There is shown in FIG. 4 a portion of the apparatus 10 at the side wall 25 of the painting booth wherein the entire apparatus 10 is located in the interior 27 of the booth. A coupling conduit 30 is attached to the surface 11b for routing electrical and fluid lines into the interior 11e of the frame rail 11. The coupling conduit 30 extends through the side wall 25 into the aisle 28.

Elevating the frame rails 11 above the path of the upper surfaces of the objects being painted allows a simple means for connecting the cross support members 14 between the opposing frame rails providing a path for any supply lines. Thus, the electrical power and fluid sources can be located in the aisle 28 adjacent the exterior of the left side wall 25, for example, to supply the painting devices 16 on both sides of the booth. Also, it is advantageously less costly than adding support steel to the paint booth to support the cantilever loads of traditional prior art floor mounted robot rails.

In addition, elevating the frame rails 11 places many of the typical maintenance components such as linear axis drive components and cable and hose carriers (not shown) out of the area where the paint overspray would typically accumulate on equipment in a prior art down draft spray booth. These components do not need to be protected against the overspray as diligently as a prior art floor mounted rail. This advantageously lowers the cost for protective covers and seals (not shown) while lowering the ongoing maintenance cost over the life of the robots 16. Elevating the frame rails 11 also permits unobstructed viewing into the paint booth 21, through windows 31 (see FIG. 2) provided in the side wall 25, which is a benefit for system operators. The elevated rail apparatus 10 and 20 also allows access doors (not shown) to be placed in the side walls 25 when they would typically be located at the rear wall 22 and the front wall 24 of the booth 21. This again reduces the overall length of the booth 21.

Furthermore, elevating the frame rails 11 above the object, such as a vehicle, vehicle to be painted allows the booth 21 to be made narrower than required for a traditional five to seven axis robot and does not require installation of components in the aisle 28 that are typically found in prior art floor-mounted installations. The elevated frame rail 11 and the robots 16 also advantageously allow the arm of each of the robots, discussed in more detail below, to reach under itself and paint the side of the vehicle because the robot base is not trapped between the side wall 25 and the vehicle.

As shown in FIGS. 1 and 2, a plurality of the articulated arm robots 16 is attached to the elevated frame rails 11 at various mounting bases 15 that move along the rails and allow the applicators 17 to follow an object to be painted, such as a vehicle body (not shown), as it moves through the paint booth 21. The applicators 17 are preferably a circular spray pattern bell applicator. By installing multiple articulated arm robots 16 on the common frame rails 11, the vehicle can be processed with each applicator 17 spraying for a higher percentage of time, and requiring fewer of the robots 16 and corresponding applicators 17 as compared to floor mounted systems.

With a simplified robot 16, the design of the structural elements of the elevated rail apparatus 10 and 20 (the frame rail 11, the legs 13 and the cross supports members 14) are fit within the narrow width space limitations of a standard bell zone paint booth 21. Furthermore, utilizing the elevated rail apparatus 10 in conjunction with the higher flexibility of a multi-axis manipulator, discussed in more detail below, yields higher application efficiencies, and thereby reduces the length overall length of a traditional bell zone paint booth 21.

Figure 5:
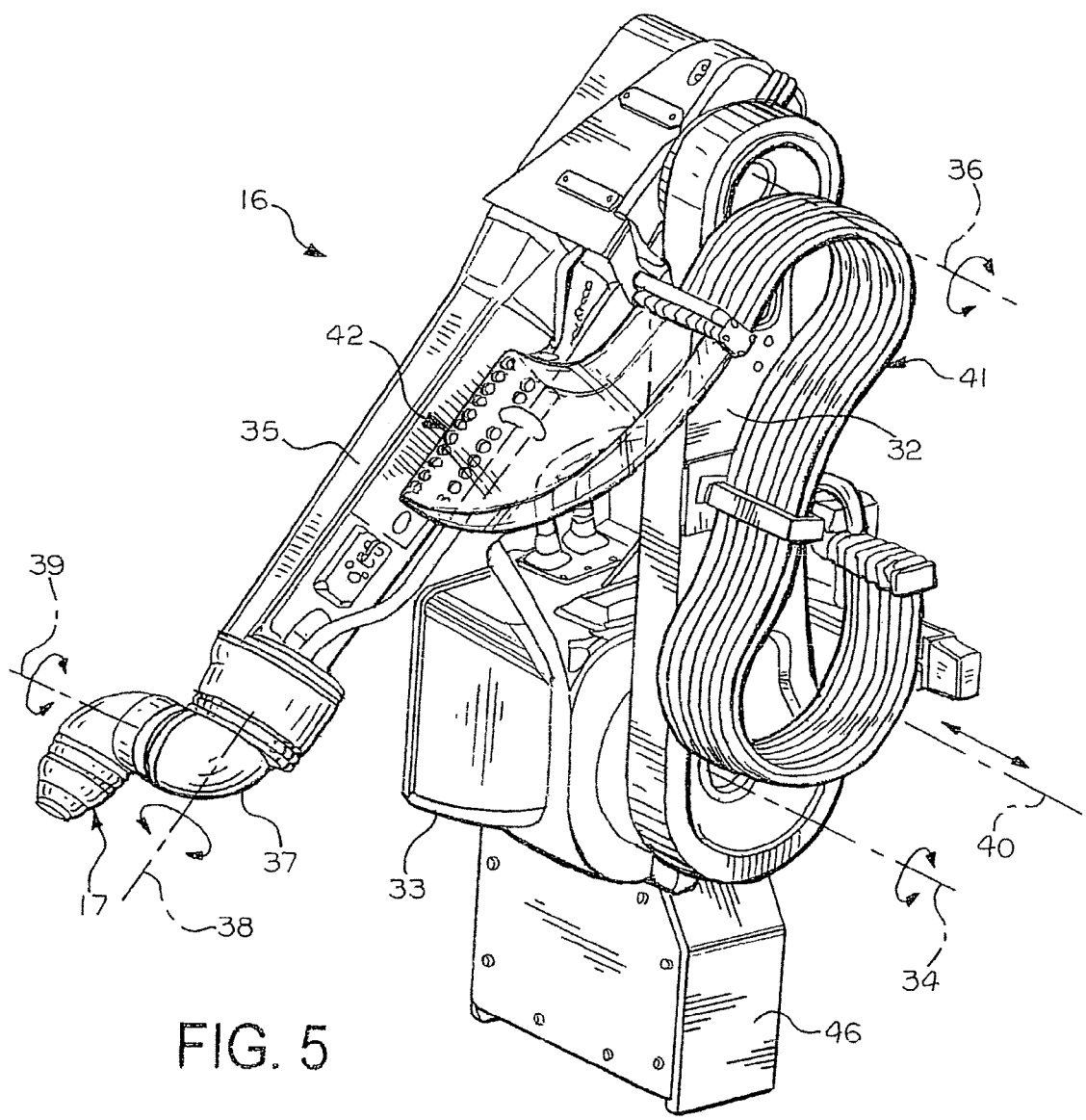
FIG. 5 is a perspective view of one of the painting robots shown in FIG. 1.

As shown in FIG. 5, the preferred painting device 16 is a four axis articulated arm robot terminated at a free end of the arm by the paint applicator 17 shown as a rotary bell applicator. The robot 16 includes a first or inner arm portion 32 mounted at a first end to a robot base 33 for rotation about a shoulder axis 34. A second or outer arm portion 35 is mounted at a first end to a second end of the inner arm 32 for rotation about an elbow axis 36. A wrist 37 attaches the paint applicator 17 to a second end of the outer arm 35 and has a rotating axis 38 and a tilting axis 39. The wrist 37 rotates the applicator 17 about the axis 38 which is generally parallel to a longitudinal axis of the outer arm 35 and rotates the applicator 17 about the axis 39 to tilt the applicator relative to the axis 38. Thus, the robot 16 provides four axes of motion relative to the base 33 for movement of the arm portions 32 and 35, the wrist 37 and the applicator 17 in vertical planes. A fifth axis of motion is a rail axis 40 provided through the attachment of the robot base 33 to the mounting base 15 (FIG. 1) for reciprocating movement of the robot 16 along the horizontal longitudinal axis of the associated frame rail 11 (FIG. 1).

Preferably, the structural components of the outer arm portion 35 and the wrist 37 are formed from a non-conductive material having suitable structural strength and impervious to the corrosive properties of solvents used in the painting environments, such as LAURAMID A material "LAURAMID" is a registered trademark of Albert Handtmann ELTEKA Verwaltungs-GmbH of Biberach, Germany. The LAURAMID A material is a castable polyamide Nylon 12G material that also provides for electrostatic isolation, cleanliness, cleaning capability, and weight advantages. Grounding of internal gearing (not shown) in the wrist 37 and other conductive components is not necessary for use in the paint booth 21 because they are suitably insulated. Non-grounded components are advantageously less likely to attract paint overspray resulting in a cleaner robot 16 requiring less maintenance and having better transfer efficiency of the paint to the vehicle, all resulting in less operating cost. The conductive components could also be charged at a lower or the same potential as the spray applicator.

A plurality of paint lines 41 is routed along the side of the inner arm 32 and the lines connect to a color changer 42 mounted in the outer arm 35. The outer arm 35 houses a paint canister (not shown) for receiving a supply of paint through a selected one of the lines 41 and dispensing the paint to the applicator 17. Also housed within the outer arm 35 is a high voltage cascade (not shown) for electrostatically charging the paint for application to the object being painted.

Figure 6:
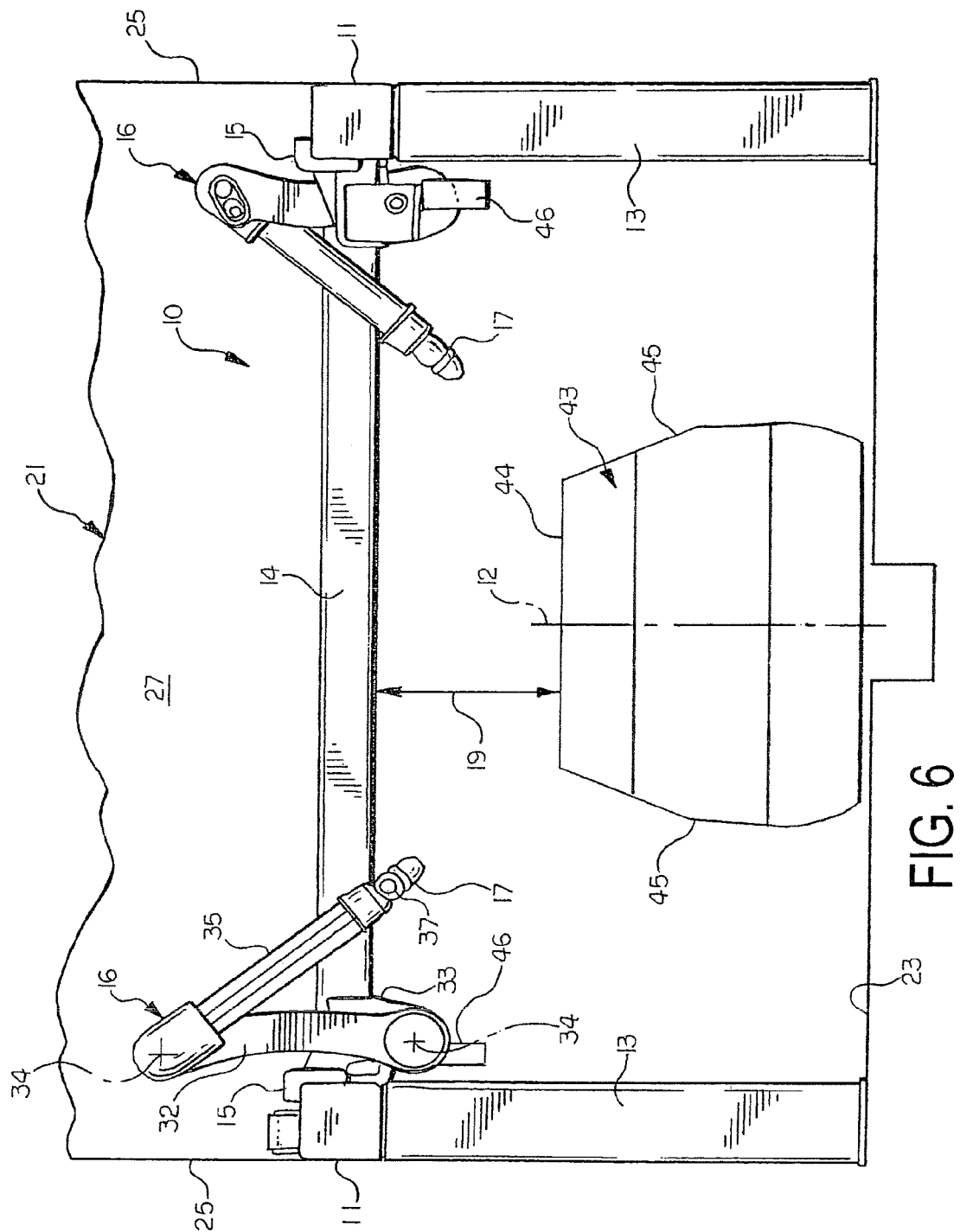
FIG. 6 is a front elevation view of the elevated rail apparatus of FIG. 1 installed in a painting booth for painting a vehicle body.

FIG. 6 shows the elevated rail apparatus 10 installed in the interior 27 of the painting booth 21 for painting a vehicle body 43. The base 33 and the shoulder axis 34 of each of the robots 16 are located above the horizontal plane of the axis 12 of movement of an upper surface 44 of the vehicle body 43 which maximizes the capability of the robots. A one of the robots 16 dedicated to painting the top 44 of the vehicle body 43 can advantageously paint a side 45 of the vehicle body if necessary in a degrade mode, such as if a one of the robots 16 dedicated to painting the side fails, because of the extension capabilities that the translation axes 34 and 36 provide. In addition, the elevated frame rails 11 and cross support members 14 allow for the placement of a process control enclosure 46 (FIGS. 5 and 6), which includes pneumatic valves and bell control components (not shown), below the robot base 33 and in the paint booth 21, in an easily accessible type X purge enclosure.

The robot 16 being attached to the movable mounting base 15 on the elevated frame rail 11 allows the applicator 17 to follow the vehicle body 43 as it moves through the booth 21. By utilizing multiple opposed robots 16 on opposed frame rails 11, and by using a line tracking motion capability, the vehicle body 43 can be painted with each applicator 17 spraying for a high percentage of the available cycle time. For example, the robots 16 adjacent to the exit wall 22 (FIG. 2) can be spraying a portion of one vehicle body while the robots 16 adjacent to the entrance wall 24 can be spraying a portion of another vehicle body.

The robot primary axes 34 and 36 advantageously operate the robot arm portions 32 and 35 in a vertically extending planar space with respect to the axis 12. Opposed robots 16 are provided for symmetric painting of objects such as the vehicle body 43. Preferably control lines (not shown) are run through the cross support members 14 in order for a single controller (not shown) to control a pair of the opposed robots 16 for painting the opposite sides of the vehicle body 43.

The geometry of the robot 16 and the mounting base 15 allows one painting robot to reach substantially all paintable surfaces on the top 44 and one side 45 of the vehicle body 43 in a degraded mode of operation. The elevated rail apparatus 10 or 20 advantageously provides for the use of multiple robots 16 on the same frame rail 11 having the capability to paint various size vehicle bodies 43 within the paint booth 21. The geometry of the robot 16 and the elevated mounting location also eliminates human safety issues associated with placing traditional prior art robots in proximity of manual spray zones. Because the robot 16 is a planar device with respect the longitudinal axis of the frame rail 11 and does not have a waist axis as in the prior art floor mounted painting robots, the robot 16 does not have the capability to extend the applicator 17 beyond the ends of the spray zone. Furthermore, the geometry of the robot 16 and the elevated mounting location allows the robot to extend underneath the frame rail 11 into a protected enclosure (not shown) so that the robot can be serviced while the remaining robots 16 in the paint booth 21 continue painting. The protected enclosure has provisions for use of dynamic limiting devices to ensure operator safety.

The contents of the U.S. Provisional Patent Application Ser. No. 60/423,636, filed Nov. 4, 2002, entitled "Robotic Apparatus for Waterborne Painting", are incorporated herein by reference.

Figure 7:
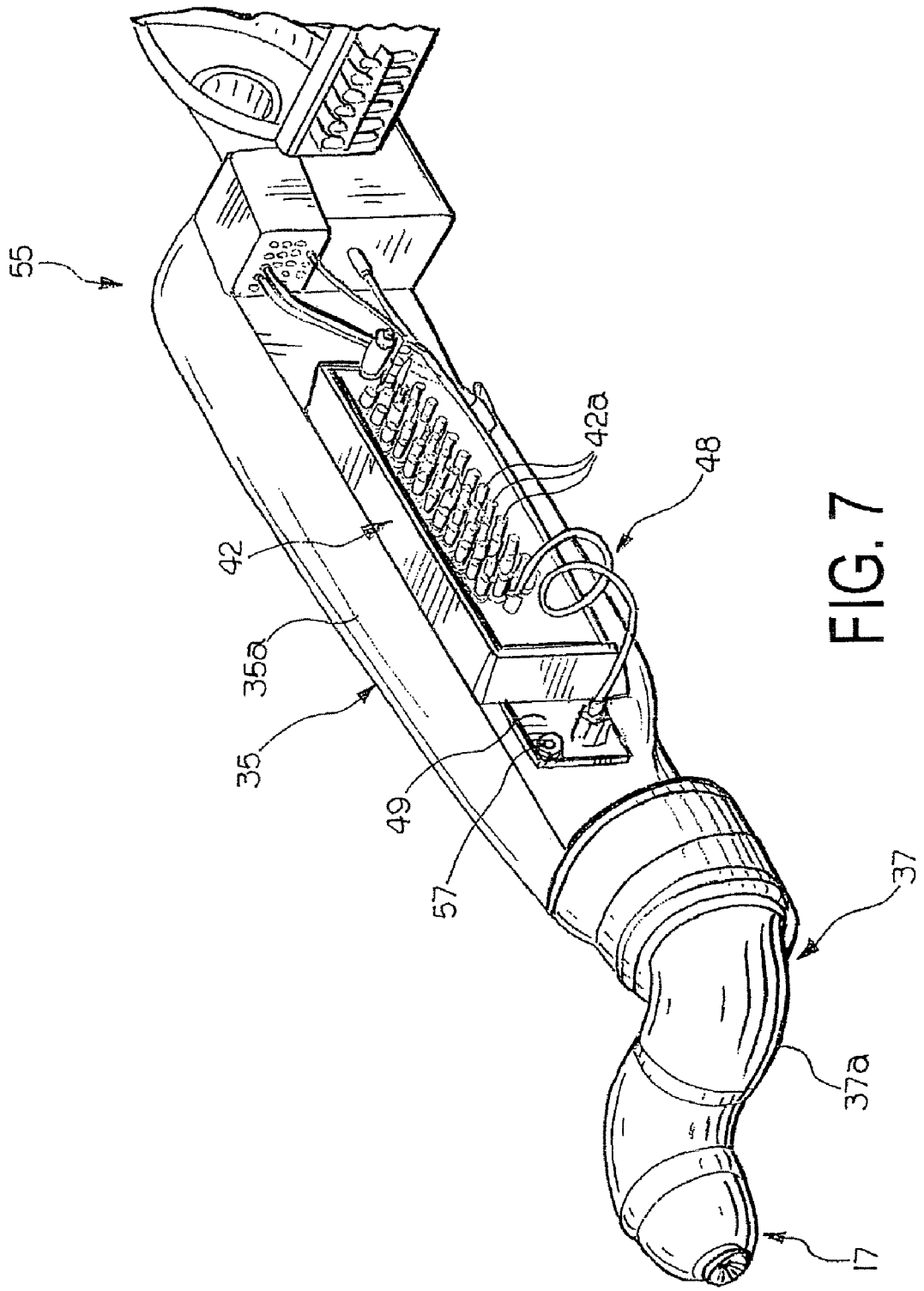
FIG. 7 is an enlarged perspective view of the outer arm shown in FIG. 5 from the color changer side.
Figure 8:
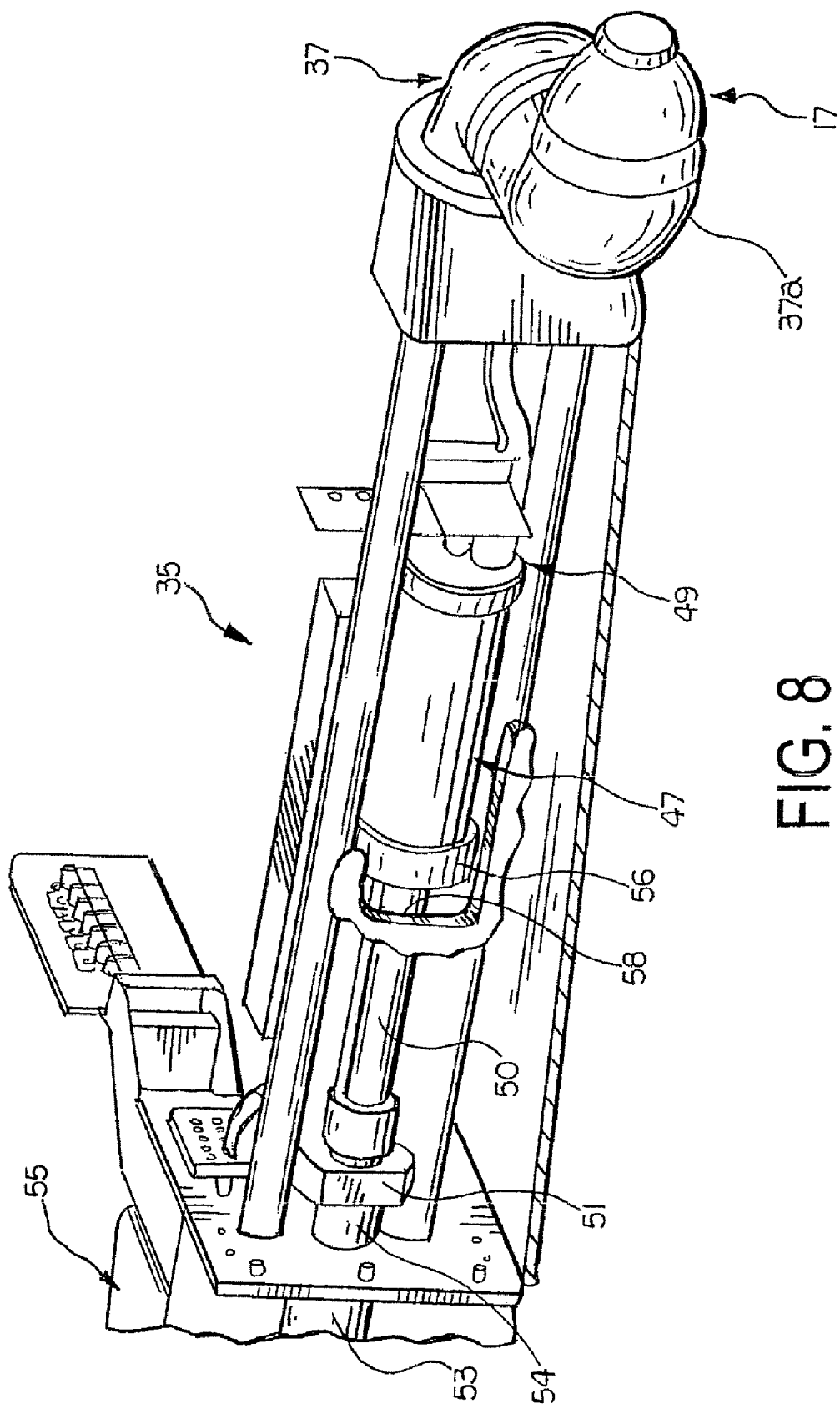

The outer arm 35 of the robotic painting device 16 of FIG. 5 is shown from the side of the color changer 42 in FIG. 7 and from the side of an internal paint canister 47 in FIG. 8. The outer arm 35 according to the present invention incorporates some of the features that were present in the traditional waterborne applicator and integrates them into a robotic paint application device whereby the arm and wrist components are constructed of a non-conductive material. A housing or shell 35*a* of the robot outer arm 35 and a housing or shell 37*a* of the wrist 37 are constructed of a suitable non-conductive material such as LAURAMID A Nylon 12G. The color changer 42 having a plurality of electrically grounded color valves 42*a* is mounted on an exterior side surface of the housing 35*a* as best seen in FIG. 7. On the opposite side of the outer arm 35, there is mounted the electrically charged paint canister 47 inside the wall of the housing 35*a* thereby separated from the grounded color valves 42*a* on the other side. This configuration allows the use of the same color valves 42*a* and the same applicator 17 as used in a solvent paint system, thereby resulting in both lower cost and common hardware platforms. In addition to the cost savings, the described hardware arrangement also minimizes the weight of the hardware to be mounted on the robot wrist 37 which allows the use of a lower cost robotic manipulator to perform the painting function. Another benefit of integrating the waterborne hardware internal to the robot arm 35 is that it removes the hardware from "harms way" and from potential collisions that are frequent with hardware that is mounted on a robot wrist.

A key aspect of the present invention is the means by which the isolation of the paint canister 47 is achieved. Often, in prior art systems, a physical disconnection (or air gap) provided isolation between the paint canister and the paint supply. The electrostatics would be discharged and the applicator would physically connect to the docking station to receive the appropriate color and amount of paint. In the painting apparatus 16 according to the present invention, no docking is required and the electrostatic isolation is achieved through a minimal length of FEP (fluorinated ethylene propylene) line that is cleaned, dried, and pressurized after the canister 47 is filled and prior to the electrostatic charge being turned on. As shown in FIG. 7, a paint transfer and isolation line 48, formed of FEP material, is connected between an outlet of the color changer 42 and a canister manifold 49 in fluid communication with an interior of the canister 47.

Figure 9:
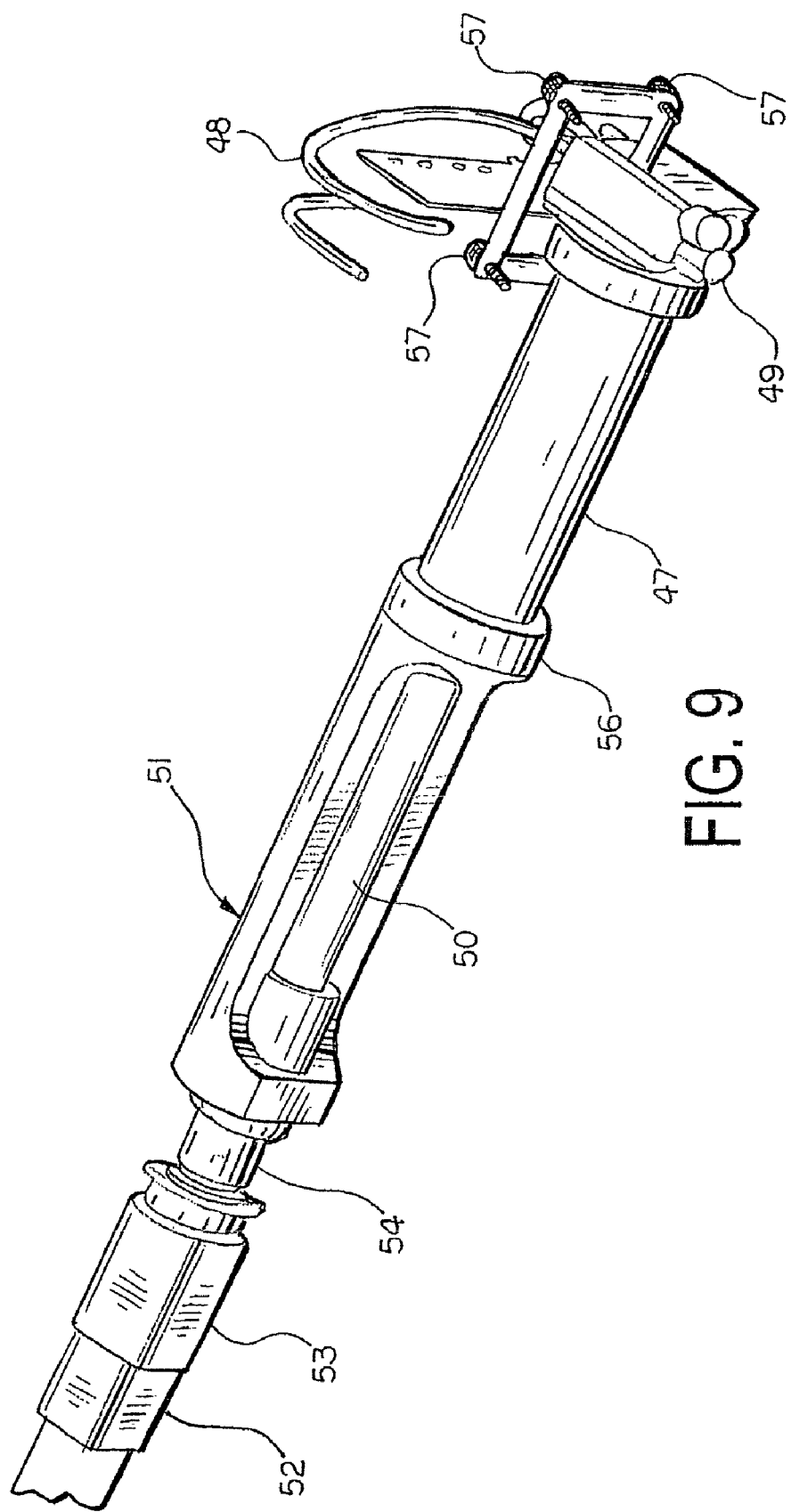
FIG. 9 is a perspective view of the canister and drive assembly shown in FIG. 8.

There is shown in FIG. 9 the canister 47 and an associated drive system. A quick disconnect piston ram 50 is retained in a drive bracket 51 mounted in the housing 35a (FIG. 8). A drive motor 52 provides rotational power to a reducer 53 that is connected to the piston ram 50 through a coupling 54. The piston ram 50 is a ball screw type drive that is utilized to dispense paint to the applicator 17 during a vehicle painting operation. The mechanism 50 features a ram attached to a piston (not shown) movable in a cylinder (not shown) formed inside the canister 47, which allows the piston to be driven all the way to the bottom of the cylinder thereby minimizing paint waste and canister cleaning effort. This configuration, allows the canister drive motor 52 and the reducer 53 to be positioned in an elbow 55, connecting the outer arm 35 to the inner arm 32, thereby locating the motor 52 a considerable distance from the electrostatics (not shown) associated with the canister 47. After a painting operation, the electrostatics are turned off and the dispensing canister 47 is isolated from the grounded paint supply lines at the color changer 42 by utilizing the insulating properties of the material (LAURAMID A) from which the outer arm housing 35a is formed. The dispensing canister 47 is mounted on the opposing side of the outer arm 35 from the color changer 42 and is fully surrounded by and enclosed in the insulating material of the housing 35a.

When cleaning of the interior of the canister 47 is required, the attached piston/ram 50 is backed off the cylinder bottom to effectively clean the area between the piston face and the bottom of the canister. The attached ram allows the piston to be cycled (in/out) during the application of the solvent and air mixture. The cleaning of the canister 47 with a solvent and air mixture occurs at the same time that the paint line from the canister to applicator (not shown) is backflushed out an in-arm dump line. The solvent and air mixture can be created by cycling the solvent inlet and air inlet valves in opposing cycles or by use of a solvent and air mixing valve whereby the solvent and air valves are actuated at the same time and a volumetric flow control device is used to have a proper ratio of solvent and air for effective cleaning. After canister cleaning, the system is ready to be filled with a new color of paint. A benefit of this system is that the cleaning process can begin while the manipulator (robot) is on route to the cleaning or "home" position.

To reduce repair time, the in-arm canister 47 must be easily removed for routine service and maintenance. The painting device 16 according to the present invention incorporates features that allow for removal of the canister 47 and the canister manifold 49 in four easy steps. The canister 47 is attached to the drive bracket 51 by a canister quick disconnect 56. Firstly, the canister manifold 49 is disconnected from the arm housing 35a by removing a plurality of fasteners 57 (see FIGS. 8 and 9). Secondly, the canister quick disconnect 56 is rotated until loose. This permits sliding movement of the disconnect 56 towards the canister manifold 49. Thirdly, rotate a ram locking key (described below) to an open position. Fourthly, remove the canister manifold 49 and the canister 47 through a window 58 (FIG. 8) formed in the arm housing 35a.

Figure 10:
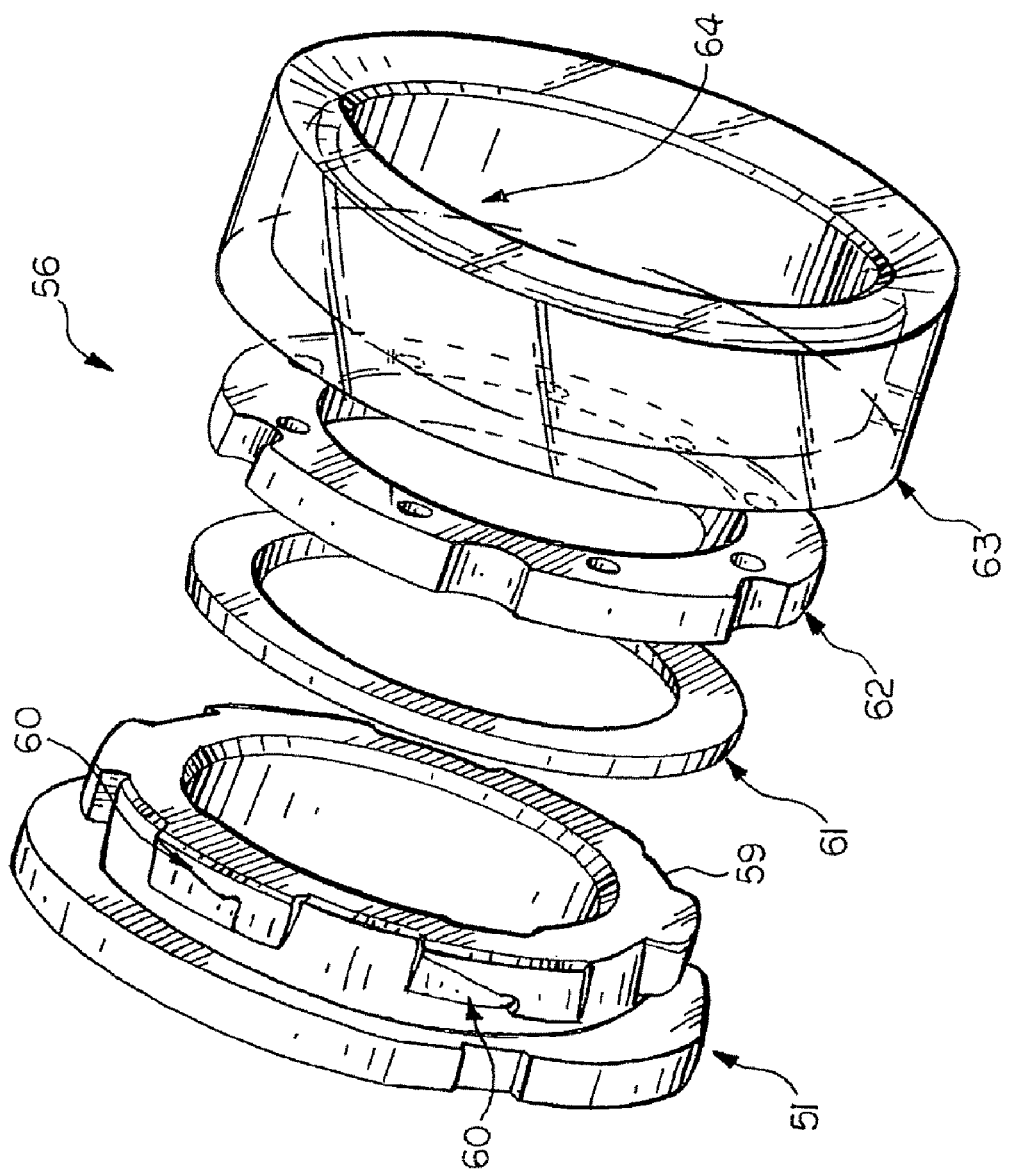
FIG. 10 is an enlarged exploded perspective view of the canister quick disconnect shown in FIG. 9.

The canister quick disconnect 56 is shown in more detail in FIG. 10. The drive bracket 51 has a reduced diameter end 59 with a plurality of convex locking means 60 formed at spaced locations on an annular surface thereof. A spring washer 61 is retained between facing surfaces on the end 59 and a canister flange retainer 62 attached to an end of the canister 47 (not shown). A quick disconnect retainer 63 is slidably received on the canister 47 and is retained by the canister flange retainer 62. A plurality of concave locking means 64 are formed on an interior surface of the retainer 63 and cooperate with corresponding ones of the convex locking means 60. To assembly, the flange retainer 62 of the canister 47 is moved into engagement with the end 59 of the drive bracket 51 with the spring gasket 61 therebetween. The retainer 63 is moved toward the drive bracket 51 with the concave locking means 64 aligned in the spaces between the convex locking means. Then the retainer 63 is rotated in a counterclockwise direction to engage associated ones of the concave locking means 64 with the convex locking means 60. To release the canister 47 from the drive bracket 51, the assembly process is reversed.

Figure 11:
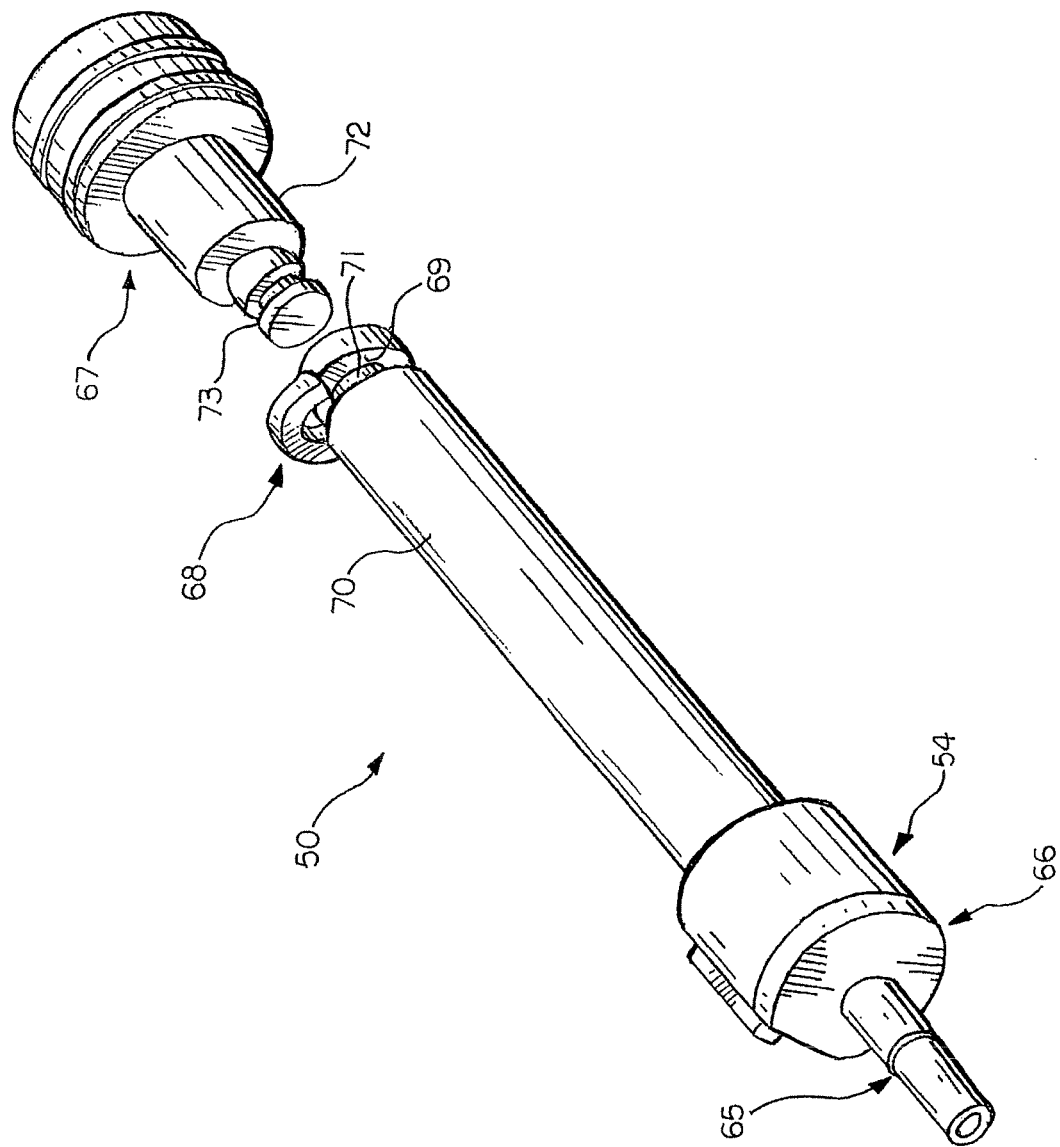
FIG. 11 is an enlarged exploded perspective view of the quick disconnect piston ram shown in FIG. 9.

The quick disconnect piston ram 50 is shown in more detail in FIG. 11. At one end is the coupling 54 including a ball screw 65 and a cooperating ball screw nut 66. As the ball screw 65 is rotated by the drive motor 52 (FIG. 9) through the reducer 53 (FIG. 9), the ball nut screw 66 is moved along a longitudinal axis to either extend or retract a piston 67 attached at an opposite end of the piston ram 50. The piston 67 is received in the cylinder (not shown) formed in the canister 47 (not shown). The piston 67 is releasably retained on the piston ram 50 by a ram locking key 68. The key 68 is generally C-shaped and is sized to slide radially into a semi-circular slot 69 formed adjacent an end of a ram body 70. The slot 69 opens to a central bore 71 extending from the end surface of the body 70. The piston 67 has a rod 72 extending longitudinally therefrom that is received into the bore 71. The rod 72 has an annular groove 73 formed therein for receiving the key 68 to releasably attach the piston 67 to the ram body 70. The key 68 can snap into the groove 73 or use any well-known detent mechanism to engage in the slot 69.

The various modes of operation of the painting device 16 are as follows with reference to FIGS. 5 and 7-11:

A. Fill Through Restrictor and Torque Sensing—With the piston 67 slightly pulled away from the cylinder bottom and an applicator trigger valve open, the paint flows from the selected one of the color valves 42a through the isolation line 48 and into the canister 47. As the initial volume of the canister is filled through the trigger passage, air is pushed out of the system until the paint reaches a restriction in the trigger fill passage. At this time there is a sudden rise in pressure in the system due to the viscosity difference between the paint and the air being displaced by the paint. The pressure increase will cause the torque applied by the drive motor 52 to the ball screw 65 to increase which can be sensed and used to provide automatic adjustment of the trigger fill time or as a diagnostic to allow the user to adjust a timed value. The canister 47 and canister manifold 49 are now "primed" (filled through the restrictor and trigger passage) and the system is ready for a "fast fill" mode of operation.

B. Fast Fill with the Attached Piston and Ram—The attached piston and ram combination 50 allows the system to be utilized in several ways to minimize the canister fill time. A first way is to match the paint fill rate. If the paint fill rate into the canister 47 is known or can be automatically measured, the rate at which the canister piston mechanism 50 is retracted can be adjusted to minimize the pressure drop of the incoming paint and therefore decrease the fill time. The fill rate can be sensed by measuring either the servo error (positive or negative) or the motor torque applied to the canister piston mechanism. A second way is to set the fill rate below capability. The piston ram mechanism 50 can be retracted at a velocity that is known to be slightly below the system fill rate capability. A third way is "syringing" of the paint with vacuum assist. The fill time can be decreased by pulling the attached piston ram 50 back at a rate greater than the fill rate capability of the bulk supply system. For example, the attached piston ram 50 can be quickly pulled back to the fill target position and held until the paint fill catches up. This will create a vacuum internal to the canister 47 and will further increase the fill rate of the paint.

C. Torque Sensing at the Fill Target—When the fill target is reached, the fluid pressure in the canister 47 will begin to increase. This increase in pressure can be measured via the torque that the drive motor 52 is applying to the ball screw 65. When the torque increase is detected, the canister inlet valve can be closed. This feature can be used as a diagnostic tool to adjust the fill time or as an automatic means to adjust the fill sequence as described above. Moreover, the piston movement direction can also be reversed toward the dispensing direction instead of the fill direction to ensure that the system is filled correctly and devoid of entrapped air. The inlet and outlet valves are closed while the piston moves forward in the dispensing direction as the entrapped air is compressible, whereby a fluid filled system devoid of entrapped air would quickly build pressure. This pressure can be sensed by the dispensing canister drive system.

D. Utilization of Air or Solvent to Push to Minimize Paint Waste—Due to the high cost of the paint product, it is very important to minimize all sources of color change paint waste. Because of this, the capability to utilize the volume of paint internal to the paint color valves 42a and the isolation line 48 is provided. The volume of paint from the color valves 42a, through the isolation line 48, to the canister 47 can be referred to as "V2". If we assume that the Fast Fill operation as described above was to a volume "V1", the Total Fill Target=V1+V2. After the fast fill to the volume "V1" has occurred, the piston 67 is stopped, the paint supply valve is closed, the air or solvent supply valve is opened and the piston 67 is then retracted at a rate such that a great portion of the paint in the line 48 is pushed or pulled into the dispensing canister 47. When the Total Fill Target volume is reached, the canister inlet valve is closed and the air supply valve is shut off. The canister pressure will increase which can be detected by the increasing motor torque, which is used to confirm that the system is properly filled. The fill process is now completed. In addition to the mechanical hardware to achieve such an air push, software controls (located in the process control enclosure 46 of FIG. 6) are required to successfully accomplish the air push operation.

E. Utilization of Paint Pig to Minimize Paint Waste—The system is also capable of utilizing a non-connected piston (paint pig, not shown) which is injected into the transfer line 48 at the beginning of the color changer (furthermost point in the transfer line away from the isolation/dispensing canister 47) and is used to fully expel the paint into the isolation canister. The line can be cleaned and dried behind the pig such that isolation means are provided. The pig is then pushed back after the painting cycle and the process is repeated.

F. Cleaning of the Isolation and Dump Lines—After the filling of the canister 47 and the air push, any remaining paint in the isolation line 48 and the dump line must be cleaned with the solvent and air, or a solvent and air mixture, and then dried. After the isolation line and the dump line are cleaned, the high voltage can be turned on to charge the paint supply. While the high voltage is turned on, a flow of air can be maintained in the isolation line 48 or the isolation line can be pressurized with dry air. The in-arm dump line terminates at some point within the application vicinity and the downstream end of the line is electrostatically isolated from ground potential. As a result, no unintended physical disconnect to ground can occur.

G. High Voltage on with Current Limiting Function—The high voltage can be applied as the line drying process takes place. The voltage is limited by a maximum current setting which is programmed into the high voltage control unit. As the transfer line 48 is dried, the high voltage increases to the required setting for painting. This process can be accomplished as the painting device (robot) 16 moves to the starting position for painting, thereby reducing the overall cycle time.

The isolation system according to the present invention, as described above, can be used for both rotary atomizers and automatic spray guns.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A painting apparatus having a robotic arm with a paint applicator mounted thereon comprising:
    a wrist having one end for attaching to an outer end of the robotic arm and an opposite end for mounting the paint applicator, said wrist having an external housing being a structural component thereof and capable of supporting the paint applicator, and said housing being formed of a non-conductive material impervious to corrosive properties of solvents used in painting environments.

2. The apparatus according to claim 1 wherein said housing is cast from a polyamide material.

3. The apparatus according to claim 1 wherein said wrist has a rotating axis of movement and a tilting axis of movement.

4. A painting apparatus comprising:
    an arm for a painting robot, said arm having a first housing formed of a non-conductive material and an outer end;
    a wrist having one end attached to said outer end of said arm, said wrist having a second housing being a structural component thereof and formed of a non-conductive material and said wrist having an opposite end; and
    a paint applicator mounted on said opposite end of said wrist and supported by said second housing.

5. The apparatus according to claim 4 including a paint canister mounted inside said first housing.

6. The apparatus according to claim 5 including a paint transfer line continuously connecting an interior of said paint canister to a color changer for transferring paint from said color changer to said interior of said paint canister and providing electrostatic isolation of said paint canister from said color changer during use of said paint canister for painting.

7. The apparatus according to claim 6 wherein said color changer is mounted on an external surface of said first housing.

8. The apparatus according to claim 6 wherein said color changer is mounted outside said first housing.

9. The apparatus according to claim 6 including a pig removably inserted in said paint transfer line and being slidingly moveable in said paint transfer line.

10. The apparatus according to claim 4 wherein said second housing is cast from a polyamide material.

11. The apparatus according to claim 4 wherein said wrist has a rotating axis of movement and a tilting axis of movement.

12. A painting apparatus comprising:
- an arm for a painting robot, said arm having a first housing formed of a non-conductive material and an outer end;
- a wrist having one end attached to said outer end of said arm, said wrist having a second housing being a structural component thereof and formed of a non-conductive material and said wrist having an opposite end for mounting a paint applicator;
- a paint canister mounted inside said first housing;
- a paint transfer line continuously connecting an interior of said paint canister to a color changer for transferring paint from said color changer to said interior of said paint canister and providing electrostatic isolation of said paint canister from said color changer during use of said paint canister for painting; and
- said color changer being mounted on an external surface of said first housing.

13. The apparatus according to claim 12 wherein said first housing and said second housing are cast from a polyamide material.

14. The apparatus according to claim 12 wherein said wrist has a rotating axis of movement and a tilting axis of movement.

15. A multi-axis paint robot having an outer arm portion moveable within a spray booth, an at least two-axis wrist with one end attached to the outer arm portion, and an electrostatic paint applicator attached to another end of said at least two-axis wrist, said at least two-axis wrist having capability to orient the electrostatic paint applicator toward a pad in the spray booth for painting the part, comprising: structural components of the at least two-axis wrist being constructed of non-conductive materials such that the wrist can operate safely in the paint booth without being a ground source to a charged portion of a paint delivery system associated with the multi-axis paint robot or to charged droplets leaving the electrostatic paint applicator.

16. The paint robot according to claim 15 wherein the outer arm portion has structural components constructed of non-conductive materials such that the outer arm portion can operate safely in the paint booth without being a ground source to the charged portion of the paint delivery system or to the charged droplets leaving the paint applicator.

17. The paint robot according to claim 16 wherein said non-conductive material also is impervious to corrosive properties of solvents used in painting environments.

* * * * *